UNITED STATES PATENT OFFICE.

LAWRENCE J. CARLILE AND GEORGE B. RUMPH, OF TITUSVILLE, FLORIDA.

COMBINED FERTILIZER AND INSECTICIDE.

SPECIFICATION forming part of Letters Patent No. 434,243, dated August 12, 1890.

Application filed May 19, 1890. Serial No. 352,391. (No specimens.)

*To all whom it may concern:*

Be it known that we, LAWRENCE J. CARLILE and GEORGE B. RUMPH, citizens of the United States, residing at Titusville, in the county of Brevard and State of Florida, have invented certain new and useful Improvements in Combined Fertilizers and Insecticides; and we do hereby declare the following to be a full, clear, and exact description of the invention, such as will enable others skilled in the art to which it appertains to make and use the same.

Our composition of matter is for the double purpose of fertilizing the ground around the cotton or other plant, and for destroying the eggs or young, or driving away the cut-worm or other insects likely to destroy the cotton or other plant.

Our composition consists of an intimate mechanical mixture of the following ingredients combined, approximately, in the proportions stated, viz: First, tobacco, either the stalks, stems, or other scraps, (ground fine,) ten pounds; second, bran, (either of wheat, rice, or any other grain,) eight pounds; third, cotton-seed meal, eighty pounds; fourth, insect poison, two pounds, two ounces; preferably paris-green, twenty-six ounces; powdered hellebore, (*Veratrum*, either *Veratrum niger* or *Veratrum album*,) five ounces; white arsenic, (arsenious oxide,) two ounces; India berries, (*Cocculus indicus*,) one ounce; total, thirty-four ounces. All ingredients to be thoroughly mixed as a dry powder, and to be applied on top of the ground, using a funnel, cotton-seed-meal distributer, or other convenient means therefor.

By the use of the above composition the cotton or other plant is not only nourished in its growth, but is kept free from worms or other insects.

The proportions given above may be varied slightly without materially affecting the value of our composition of matter.

We are aware that cotton seed has been used as a fertilizer, and that a solution of tobacco has been used to destroy insects, as has also paris-green; but we are not aware that all the ingredients of our composition in or near the proportions stated have ever been used together.

What we claim, and desire to secure by Letters Patent of the United States, is—

The herein-described composition of matter to be used as a combination fertilizer and insecticide, consisting of refuse tobacco, bran, cotton-seed meal, paris-green, powdered hellebore, (*Veratrum*, either *Veratrum niger* or *Veratrum album*,) arsenious oxide, and India berries, (*Cocculus indicus*,) in or about the proportions specified.

In testimony whereof we affix our signatures in presence of two witnesses.

LAWRENCE J. CARLILE.
GEO. B. RUMPH.

Witnesses:
R. A. JACKSON,
SAML. STAPLES.